(12) United States Patent
Nakase et al.

(10) Patent No.: US 7,953,733 B2
(45) Date of Patent: May 31, 2011

(54) RECORDING/PLAYBACK APPARATUS, RECORDING/PLAYBACK METHOD, PROGRAM, AND STORAGE MEDIUM

(75) Inventors: Yuichi Nakase, Tokyo (JP); Yasuyuki Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 11/404,013

(22) Filed: Apr. 14, 2006

(65) Prior Publication Data
US 2006/0235888 A1    Oct. 19, 2006

(30) Foreign Application Priority Data

Apr. 18, 2005 (JP) ................................. 2005-120011
Apr. 21, 2005 (JP) ................................. 2005-123988

(51) Int. Cl.
*G06F 7/00* (2006.01)
(52) U.S. Cl. .................................................. 707/726
(58) Field of Classification Search .............. 707/726, 707/728, 786, 821
See application file for complete search history.

(56) References Cited

U.S. PATENT DOCUMENTS

| | | | | |
|---|---|---|---|---|
| 5,887,173 A | 3/1999 | Ogawa et al. | ............. | 395/704 |
| 6,829,624 B2 | 12/2004 | Yoshida | ............. | 707/205 |
| 7,383,286 B2 | 6/2008 | Hamanaka et al. | | |
| 7,715,618 B2 | 5/2010 | Shioi et al. | | |
| 2002/0052886 A1* | 5/2002 | Nagaoka | ............. | 707/200 |
| 2002/0063783 A1* | 5/2002 | Kurase | ............. | 348/232 |
| 2003/0081234 A1 | 5/2003 | Wiley | ............. | 358/1.13 |
| 2003/0191871 A1 | 10/2003 | Tohki | ............. | 710/1 |
| 2004/0184775 A1* | 9/2004 | Nakamura et al. | ............. | 386/69 |
| 2004/0263644 A1* | 12/2004 | Ebi | ............. | 348/231.2 |
| 2005/0223037 A1* | 10/2005 | Ahn et al. | ............. | 707/104.1 |
| 2006/0117053 A1 | 6/2006 | Niikura et al. | ............. | 707/102 |

FOREIGN PATENT DOCUMENTS

| | | |
|---|---|---|
| JP | 9-34755 A | 2/1997 |
| JP | 2001-128111 A | 5/2001 |
| JP | 2002-223401 | 8/2002 |
| JP | 2003-022206 A | 1/2003 |
| JP | 2004-349732 A | 12/2004 |

OTHER PUBLICATIONS

"Camera User's Guide for Canon Digital Camera Powershot A95 From Canon Inc.", 2004, p. 20.
Japanese Office Action dated Sep. 3, 2010 in corresponding Japanese Appl. No. 2005-120011.
Japanese Office Action dated Dec. 24, 2010 in Japanese Application No. 2005-123988.

* cited by examiner

*Primary Examiner* — Pierre M Vital
*Assistant Examiner* — Truong V Vo
(74) *Attorney, Agent, or Firm* — Fitzpatrick, Cella, Harper & Scinto

(57) ABSTRACT

This invention improves convenience in processing such as data search in a recording/playback apparatus such as a digital camera. This apparatus includes a recording unit which generates a plurality of directories DCIM and SNDR having the same directory structure on a layer of hierarchy immediately below a root directory at the uppermost level in the hierarchical structure of a recording medium, and respectively records image data and audio data in the plurality of directories.

7 Claims, 11 Drawing Sheets

FIG. 4
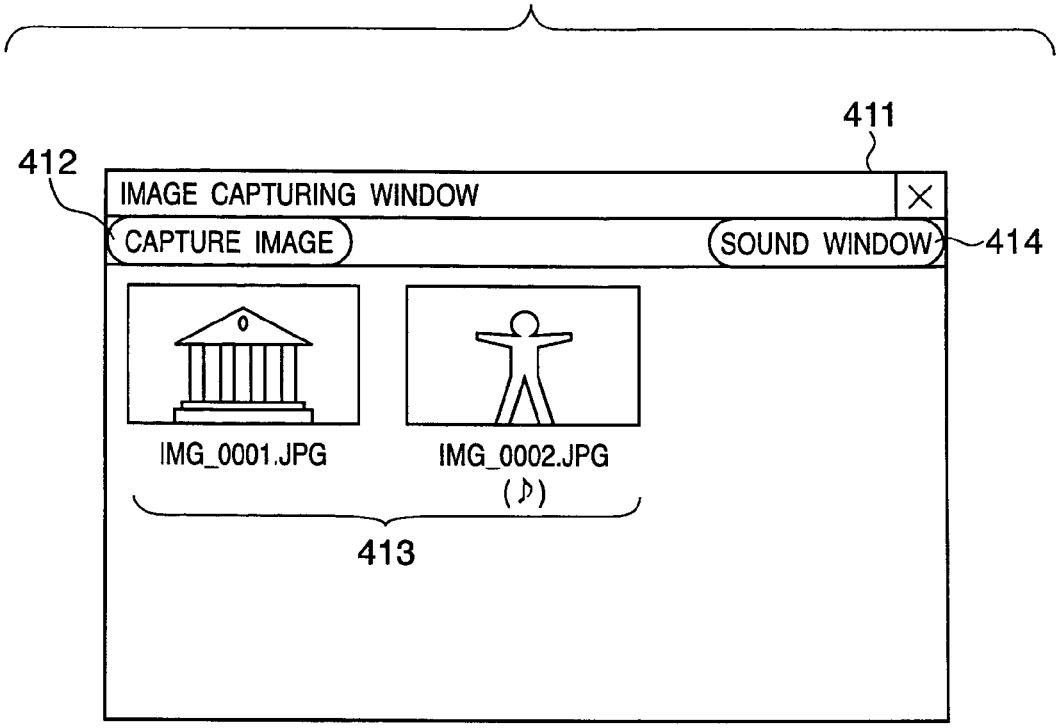
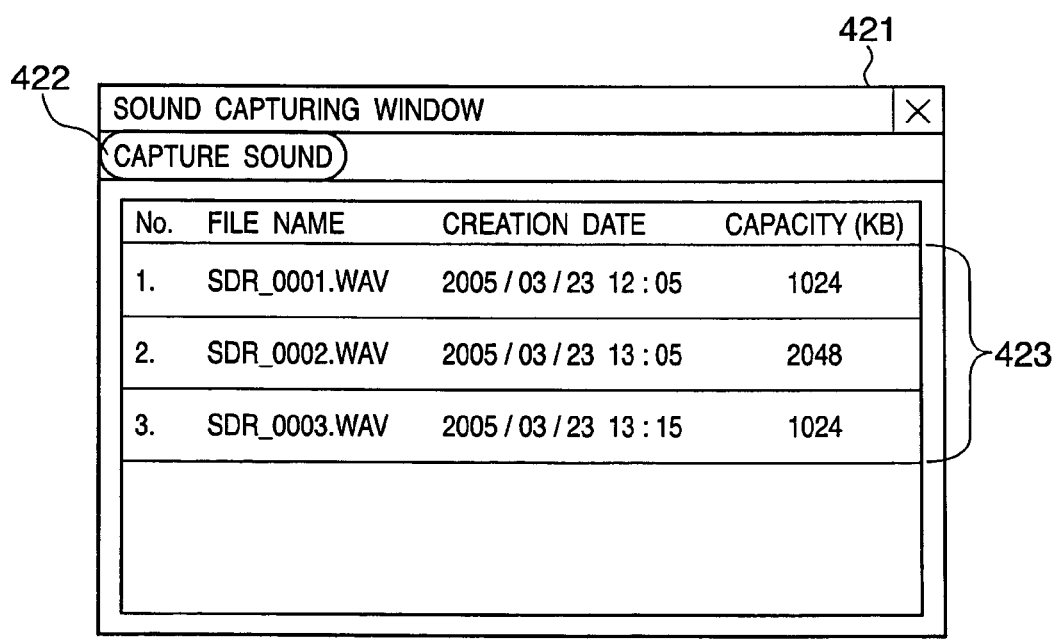

RECORDING/PLAYBACK APPARATUS, RECORDING/PLAYBACK METHOD, PROGRAM, AND STORAGE MEDIUM

FIELD OF THE INVENTION

The present invention relates to a recording/playback technique of recording and playing back image data, audio data, and the like. The present invention also relates to a file management apparatus and a control method therefor and, more particularly, to a file management apparatus which can format recording media and a control method therefor.

BACKGROUND OF THE INVENTION

Conventionally, recording/playback apparatuses such as digital cameras which use memory cards having solid state memory devices as recording media and record and play back still images and moving images have already been on the market, and digital cameras comprising electronic finders such as camera liquid crystal panels have already been on sale.

In addition, there has been a recording/playback apparatus which has a function of recording and playing back, in addition to image data, audio data or the like in a form different from that of image data in association with image data under the same directory structure as that of the image data or independently of the image data (see Japanese Patent Application Laid-Open No. 2002-223401).

In such a conventional recording/playback apparatus such as a digital camera, even when a user wants to search either image data or audio data, since audio data are arranged under the same directory structure as that of image data, processing of discriminating data in the other format which is not a search target (for example, audio data when image data is a search target) and discarding the discriminated data is necessary when directory information is analyzed. This wastes time in search operation.

In addition, a similar problem arises when some kind of processing is to be performed for either image data or audio data.

Furthermore, although the main application of a recording/playback apparatus such as a digital camera is to record and play back image data, overhead occurs due to mixing of unnecessary data such as audio data at the time of search of image data, resulting in a delay of the start of recording/playback operation.

The number of electronic apparatuses using detachable recording media, e.g., digital cameras, has recently been on the increase. Digital cameras are generally configured to record sensed images and recorded sounds as data files in recording media. If, therefore, the remaining capacity of an attached recording medium becomes insufficient, already recorded data files need to be erased to record data in the recording medium. In general, as erasure methods, a method of selectively erasing data files and a method of collectively erasing data files are provided. Such an apparatus is equipped with a function of formatting (initializing) a recording medium as a means for collectively erasing all files.

Formatting is generally processing which cannot be undone. If this processing is accidentally performed, all files are lost. In general, therefore, confirmation or warning is issued at the time of execution. For example, in reference "Camera User's Guide for Canon Digital Camera Power-ShotA95 from Canon Inc", 2004, p. 20, a currently used data size with respect to the total capacity of a recording medium is written together with the formatting function equipped in a digital camera, and there is written a warning that when formatting is executed, the displayed amount of data will be erased.

According to the above technique, a user can understand the currently used data size in a recording medium. However, the user cannot obtain information for each file type in an apparatus which can generate different types of data files including still image files, moving image files, and audio files, e.g., a digital camera.

There is also available an apparatus which has a plurality of browse modes corresponding to file types, e.g., a mode of browsing images such as still and moving images and a mode of browsing only audio data. When a recording medium is to be formatted in such an apparatus, the user cannot know the data amount of files or the number of files which are browsed only in a mode different from the currently used mode. For example, in an apparatus having an image browse mode and an audio browse mode, when a recording medium is to be formatted during the image browse mode, the user is to format the recording medium without knowing the total number of audio files. That is, the user has to delete all files including audio files without knowing the data amount or number of audio files.

SUMMARY OF THE INVENTION

The present invention has been made in consideration of the above problems, and has as its object to improve convenience in performing processing such as data search in a recording/playback apparatus such as a digital camera.

It is another object of the present invention to present more detailed information than in the prior art to a user before the execution of formatting of a recording medium in a file management apparatus capable of formatting recording media.

In order to solve the above problems and achieve the above objects, according to a first aspect of the present invention, there is provided a recording/playback apparatus characterized by comprising a recording device which generates a plurality of directories having the same directory structure on a layer of hierarchy immediately below a root directory at an uppermost level in a hierarchical structure of a recording medium and respectively records different types of data on the plurality of directories.

According to a second aspect of the present invention, there is provided a recording/playback method characterized by comprising a recording step of generating a plurality of directories having the same directory structure on a layer of hierarchy immediately below a root directory at an uppermost level in a hierarchical structure of a recording medium and respectively recording different types of data on the plurality of directories.

According to a third aspect of the present invention, there is provided a program characterized by causing a computer to execute the above recording/playback method.

According to a fourth aspect of the present invention, there is provided a program characterized by computer-readably storing the program.

According to a fifth aspect of the present invention, there is provided a file management apparatus which can format a recording medium, characterized by comprising a total file count detecting device which detects the total number of files of a predetermined type of files recorded in the recording medium, and a display device which displays the total number of files together with information indicating the predetermined type before formatting of the recording medium is executed.

According to a sixth aspect of the present invention, there is provided an image sensing apparatus characterized by comprising the above file management apparatus.

According to a seventh aspect of the present invention, there is provided a control method for a file management apparatus which can format a recording medium, characterized by comprising a total file count detection step of detecting the total number of files of a predetermined type of files recorded in the recording medium, and a display step of displaying the total number of files together with information representing the predetermined type before formatting of the recording medium is executed.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a view showing an example of a personal computer application window in the first embodiment;

DETAILED DESCRIPTION OF THE PREFERRED EMBODIMENTS

The preferred embodiments of the present invention will be described in detail below with reference to the accompanying drawings.

First Embodiment

Figure 1:
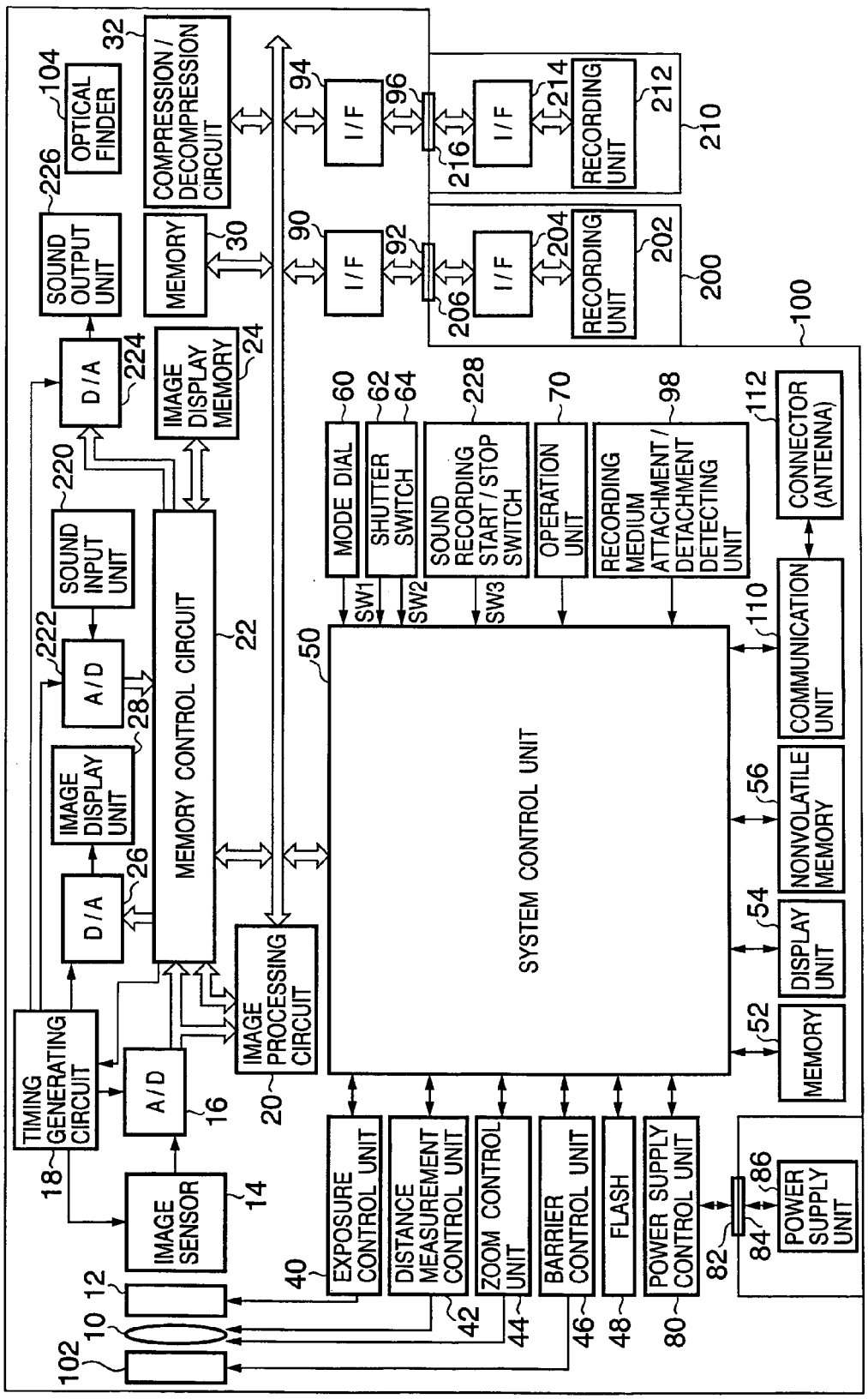
FIG. 1 is a block diagram showing the arrangement of the first embodiment in which a recording/playback apparatus for images and sounds according to the present invention is applied to a digital camera.

FIG. 1 is a block diagram showing the arrangement of the first embodiment in which a recording/playback apparatus for images, sounds, and the like according to the present invention is applied to a digital camera.

Referring to FIG. 1, reference numeral 100 denotes a digital camera.

Reference numeral 10 denotes a photographing lens; 12, a shutter having a stop function; 14, an image sensor which converts an optical image into an electric signal; and 16, an A/D converter which converts an analog output signal from the image sensor 14 into a digital signal.

Reference numeral 18 denotes a timing generating circuit which supplies clock signals and control signals to the image sensor 14, the A/D converter 16, a D/A converter 26, an A/D converter 222, and a D/A converter 224, and is controlled by a memory control circuit 22 and a system control circuit 50.

Reference numeral 20 denotes an image processing circuit which performs predetermined pixel interpolation processing and color conversion processing for data from the A/D converter 16 or data from the memory control circuit 22.

In addition, the image processing circuit 20 performs predetermined computation processing by using sensed image data, and the system control circuit 50 then controls an exposure control unit 40 and a distance measurement control unit 42 on the basis of the obtained computation result, thereby performing AF (Auto Focus) processing, AE (Auto Exposure) processing, and EF (Electronic Flash pre-emission) processing of the TTL (Through The Lens) scheme.

In addition, the image processing circuit 20 performs predetermined computation processing by using sensed image data and performs AWB (Auto White Balance) processing of the TTL scheme on the basis of the obtained computation result.

The memory control circuit 22 controls the A/D converter 16, the timing generating circuit 18, the image processing circuit 20, an image display memory 24, the D/A converter 26, a memory 30, and a compression/decompression circuit 32.

Data from the A/D converter 16 is written in the image display memory 24 or the memory 30 through the image processing circuit 20 and the memory control circuit 22 or directly through the memory control circuit 22.

Reference numeral 220 denotes a sound input unit comprising a microphone, an amplifier, and the like. An analog audio signal output from the sound input unit 220 is digitized by the A/D converter 222, and is written in the memory 30 through the memory control circuit 22.

In image playback processing, compressed image data read out from a recording medium 200 or 210 to the memory 30 is decompressed by the compression/decompression circuit 32. The resultant data is then written in the image display memory 24.

Reference numeral 24 denotes the image display memory; 26, the D/A converter; and 28, an image display unit comprising a TFT LCD and the like. The display image data written in the image display memory 24 is displayed on the image display unit 28 through the D/A converter 26.

Sequentially displaying sensed image data by using the image display unit 28 makes it possible to implement an electronic finder function.

The image display unit 28 can superimpose and display various kinds of information by OSD (On Screen Display). For example, display contents include a single shot/continuous shooting indication, a self timer indication, a compression ratio indication, an indication of the number of recording pixels, an indication of the number of recorded frames, a display image serial number indication, an indication of the remaining number of frames, a search key icon indication, a shutter speed indication, a stop value indication, an exposure correction indication, a flash indication, a red-eye reduction indication, a macro photographing indication, a buzzer setting indication, a remaining clock battery level indication, a remaining battery level indication, an error indication, an information indication by a number composed of multiple digits, an indication of the attachment/detachment state of the recording media 200 and 210, a communication I/F operation indication, a date/time indication, and the like.

Of these various kinds of information indications, conditions and settings at the time of photography can be acquired by storing various kinds of information in an image header at the time of photography and analyzing and extracting the image header at the time of playback operation. That is, in playback operation as well, the conditions set at the time of image photography can be referred to.

In audio playback operation, audio data read out from the recording medium 200 or 210 into the memory 30 is converted into an analog signal by the D/A converter 224, and is played back by a sound output unit 226 comprising an amplifier, a speaker, and the like.

The memory 30 is used to store photographed still and moving images, sounds, and the like, and has a storage capacity sufficient enough to store a predetermined number of still images or a predetermined time period of moving images.

In the case of continuous shooting, in which a plurality of still images are continuously photographed, or in the case of panoramic photographing as well, it is possible to perform image writing into the memory 30 at high speed and in high volume.

Further, it is possible to use the memory 30 as a work area of the system control circuit 50.

The compression/decompression circuit 32 compresses/decompresses image data by adaptive discrete cosine transform (ADCT) or the like. The compression/decompression circuit 32 reads in an image stored in the memory 30, compresses or decompresses the image, and writes the resultant data in the memory 30.

The exposure control unit 40 controls the shutter 12 having the stop function, and implements a flash dimming function in cooperation with a flash 48.

Reference numeral 42 denotes a distance measurement control unit which controls focusing of the photographing lens 10; 44, a zoom control unit which controls zooming of the photographing lens 10; and 46, a barrier control unit which controls the operation of a protection unit 102 as a barrier.

The flash 48 has a function of emitting AF auxiliary light and a flash dimming function.

The exposure control unit 40 and the distance measurement control unit 42 are controlled by using the TTL scheme. The system control circuit 50 controls the exposure control unit 40 and the distance measurement control unit 42 on the basis of the computation result obtained by computing sensed image data by using the image processing circuit 20.

The system control circuit 50 controls the overall digital camera 100. Reference numeral 52 denotes a memory which stores constants, variables, programs, and the like for the operation of the system control circuit 50, and stores a program for the execution of the operation shown in FIG. 3 to be described later and the like.

Reference numeral 54 denotes a display unit such as a speaker which displays operation states, messages, and the like by using sounds and the like in accordance with the execution of programs by the system control circuit 50, and comprises a combination of, for example, an LED, a sound producing element, and the like.

The partial function of the display unit 54 is installed in an optical finder 104.

Of the display contents of the display unit 54, examples of the display contents of the optical finder 104 include an in-focus indication, a camera shake warning indication, a flash charge indication, a shutter speed indication, a stop value indication, an exposure correction indication, and the like.

Reference numeral 56 denotes a nonvolatile memory which is electrically erasable/recordable, e.g., an EEPROM or the like.

Reference numerals 60, 62, 64, and 70 denote operation units for inputting various kinds of operation instructions for the system control circuit 50. Each operation unit comprises a switch, dial, touch panel, a pointing device by line-of-sight detection, voice recognition device, or the like or a combination thereof.

Each of these operation units will be concretely described below.

Reference numeral 60 denotes a mode dial switch which allows switching/setting of various function modes, such as a power-off mode, automatic photographing mode, photographing mode, panoramic photographing mode, playback mode, multi-screen playback/erase mode, and PC connection mode.

Reference numeral 62 denotes a shutter switch SW1 which is turned on midway through the operation of a shutter button (not shown) and instructs the start of various kinds of operations, such as AF (Auto Focus) processing, AE (Auto Exposure) processing, AWV (Auto White Balance) processing, EF (Electronic Flash pre-emission) processing, and the like.

Reference numeral 64 denotes a shutter switch SW2 which is turned on at completion of the operation of the shutter button (not shown) and instructs the execution start of a series of processing such as exposure processing of writing a signal read out from the image sensor 14 into the memory 30 through the A/D converter 16 and the memory control circuit 22, development processing using computation in the image processing circuit 20 and the memory control circuit 22, reading the image data from the memory 30, compression processing in the compression/decompression circuit 32, and recording processing of writing the resultant data in the recording medium 200 or 210.

Reference numeral 228 denotes a sound recording start/stop switch SW3 which instructs the start or stop of a series of operations of recording processing of writing a signal read out from the sound input unit 220 into the memory 30 through the A/D converter 222 and the memory control circuit 22 and recording processing of writing audio data from the memory 30 into the recording medium 200 or 210.

Reference numeral 70 denotes an operation unit which comprises various kinds of buttons, a touch panel, and the like, and includes a menu button, set button, macro button, flash setting button, single shot/continuous shooting/self-timer switching button, menu movement+(plus) button, menu movement−(minus) button, playback image movement+ (plus) button, playback image movement−(minus) button, and the like.

Reference numeral 80 denotes a power supply control unit which comprises a battery detection circuit, a DC-DC converter, a switching circuit for switching blocks to be energized, and the like. The power supply control unit 80 detects the presence/absence of a mounted battery, a battery type, and a remaining battery level, controls the DC-DC converter based on a detection result and instructions from the system control circuit 50, and supplies required voltages to respective units including the recording medium for required periods of time.

Reference numeral 82 denotes a connector; 84, a connector; and 86, a power supply unit which comprises a primary battery such as an alkaline battery or a lithium battery, a secondary battery such as a NiCd battery, a NiMH battery, or a Li-ion battery, an AC adapter, and the like.

Reference numerals 90 and 94 denote interfaces with recording media such as a memory card and a hard disk; 92 and 96, connectors for connection with recording media such as a memory card and a hard disk; and 98, a recording medium attachment/detachment detecting unit which detects whether the recording medium 200 or 210 is connected to the connector 92 and/or the connector 96.

Note that this embodiment exemplifies the apparatus having two systems of interfaces and connectors for the attachment of a recording medium. Obviously, however, the apparatus may have a single system of an interface and a connector or a plurality of systems of interfaces and connectors for the attachment of a recording medium. In addition, interfaces and connectors based on different standards may be combined with each other.

As the interfaces and connectors, interfaces and connectors complying with standards for a PCMCIA card, a CF (CompactFlash (registered trademark)) card, and the like may be used.

In addition, when interfaces and connectors complying with the standards for a PCMCIA card, a CF (CompactFlash (registered trademark)) card, and the like are used as the interfaces 90 and 94 and the connectors 92 and 96, connecting various kinds of communication cards such as a LAN card, modem card, USB card, IEEE 1394 card, P1284 card, SCSI card, and communication card for PHS makes it possible to exchange image data and management information attached to the image data with other computers and peripheral devices such as a printer.

Reference numeral 102 denotes a protection unit which is a barrier that prevents contamination and damage of the image sensing unit by covering the image sensing unit including the lens 10 of the digital camera 100.

Reference numeral 104 denotes an optical finder which allows photographing without using the electronic finder function implemented by the image display unit 28.

Reference numeral 110 denotes a communication unit which has various kinds of communication functions such as RS232C, USB, IEEE1394, P1284, SCSI, modem, LAN, and wireless communication.

Reference numeral 112 denotes a connector for connecting the digital camera 100 to another apparatus through the communication unit 110, or an antenna in the case of wireless communication.

The recording medium 200 includes a memory card, a hard disk, or the like.

The recording medium 200 comprises a recording unit 202 comprising a semiconductor memory, a magnetic disk, or the like, an interface 204 with the digital camera 100, and a connector 206 for connection with the digital camera 100.

The recording medium 210 includes a memory card, a hard disk, or the like.

The recording medium 210 comprises a recording unit 212 comprising a semiconductor memory, a magnetic disk, or the like, an interface 214 with the digital camera 100, and a connector 216 for connection with the digital camera 100.

The operation of the digital camera of this embodiment will be described next with reference to FIGS. 2 to 4.

Figure 2:
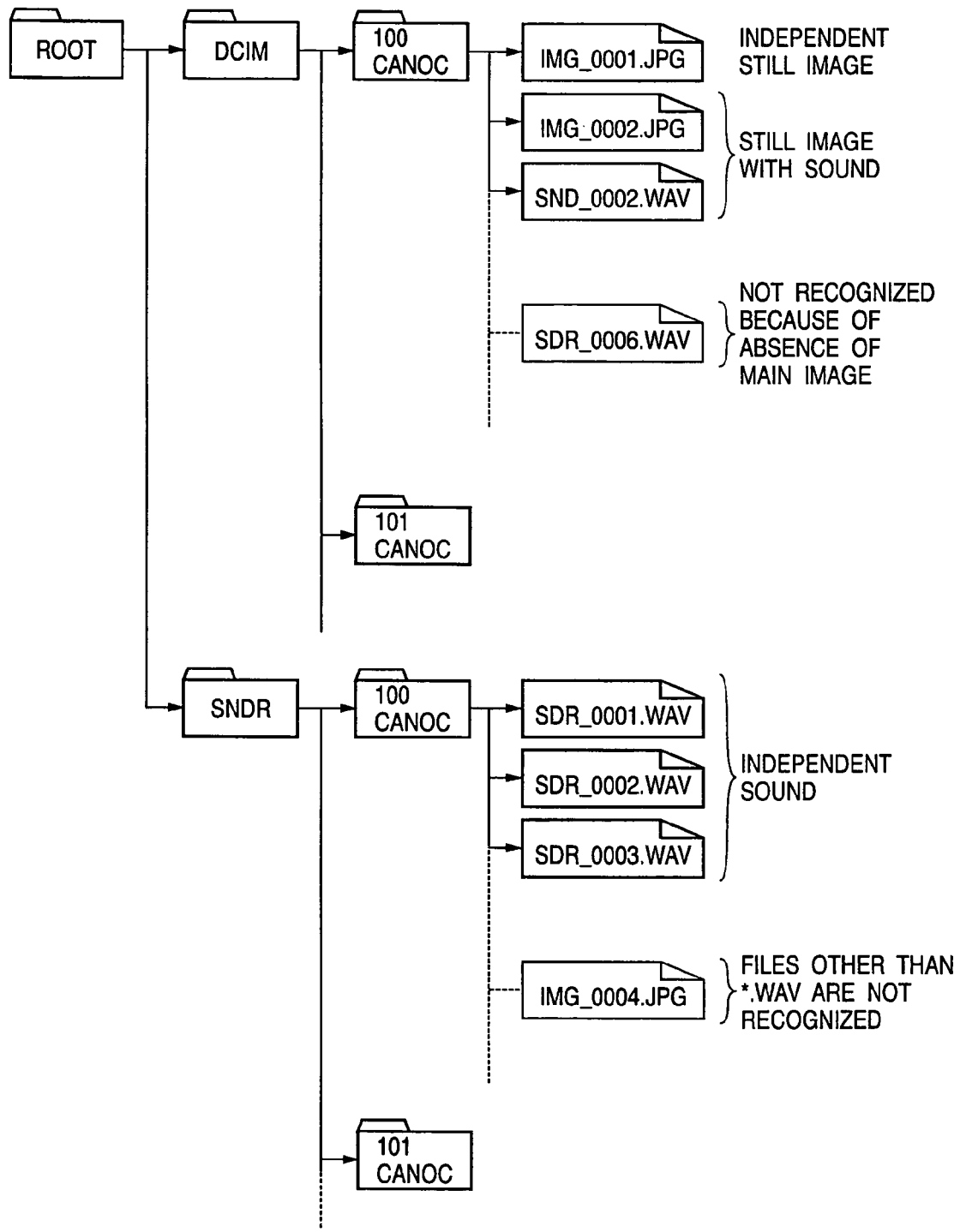
FIG. 2 is a view showing an example of the arrangement of directories and files in a recording medium.

FIG. 2 is a view showing an example of the arrangement of directories and files in the recording media 200 and 210.

A directory structure subordinate to the DCIM directory located immediately below the ROOT directory (root directory) complies with the DCF standard which is generally used for digital cameras.

According to the DCF standard, in the directory structure below DCIM, image files and files attached to the image files are handled. In the case shown in FIG. 2, therefore, IMG_0001.JPG assigned to file number 0001, IMG_0002.JPG assigned to file number 0002, and audio file SND_0002.WAV attached to IMG_0002.JPG can be recognized and played back. In this case, audio file SDR_0006.WAV cannot be recognized because there is no corresponding image file.

A directory structure below the SNDR directory located immediately below the ROOT directory is the other directory having the same directory structure as that below DCIM which complies with the DCF standard. In this case, the directory structure below SNDR is handled exclusively for sounds, in which only files having an extension recognized as an audio file are recognized.

In this case, a directory structure dedicated to audio files is used. However, a directory structure limited to another specific format, e.g., a format dedicated to moving image files or text files, may be used, or a plurality of such directory structures may be used.

When operation for only files in a specific format, e.g., only image files or audio files, is to be performed, it suffices to perform operation with respect to only a directory structure which handles a specific format.

Figure 3:
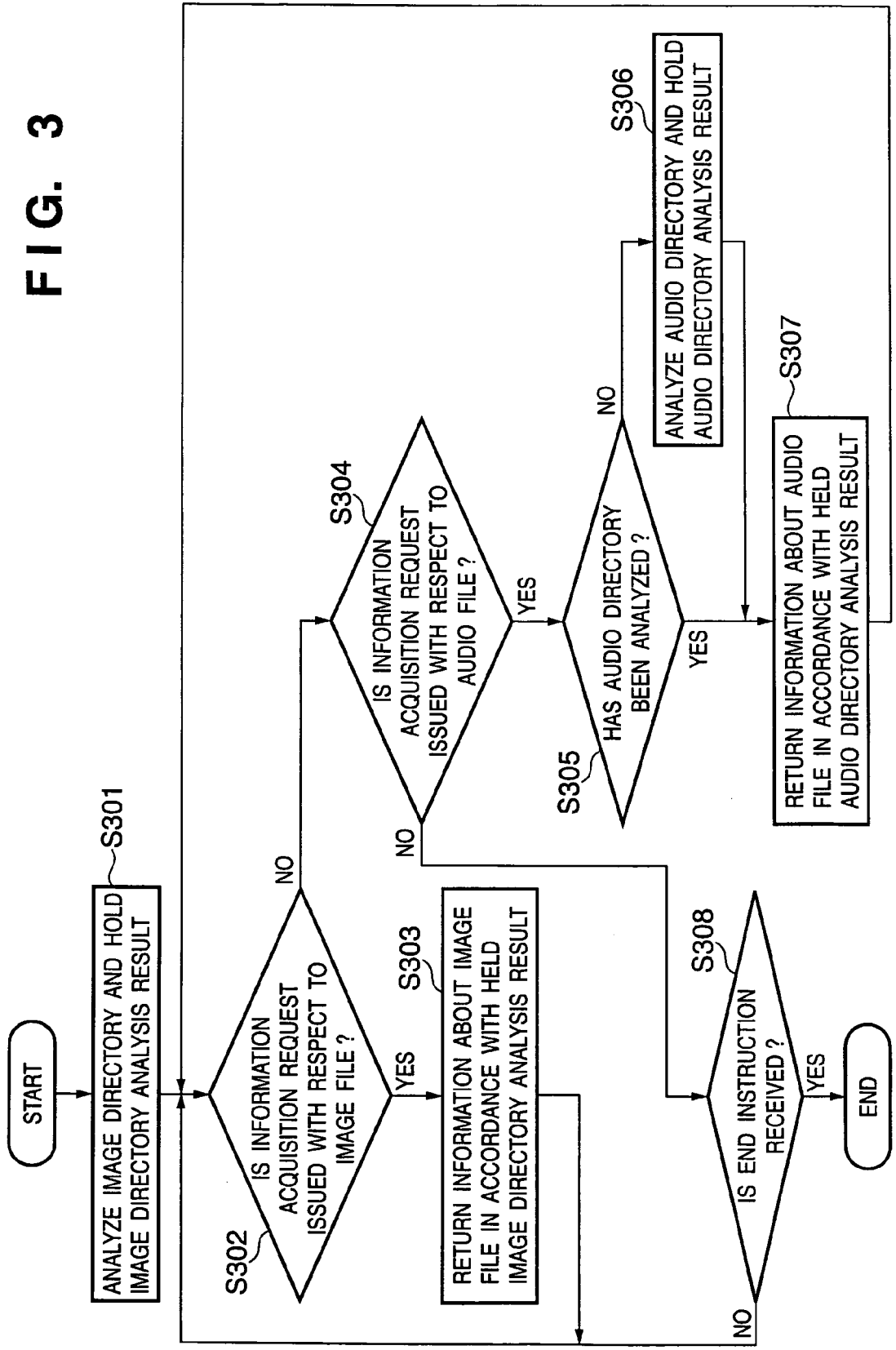
FIG. 3 is a flowchart for search processing in the digital camera according to the first embodiment.

FIG. 3 is a flowchart for search processing in the digital camera according to this embodiment.

When the digital camera 100 is activated, the following processing shown in FIG. 3 is executed.

When the digital camera 100 is activated, first of all, the image directory in the recording medium 200 or 210 is analyzed and the analysis result is held (Step S301).

In the digital camera according to this embodiment, images are recorded in compliance with the DCF standard. In this case, information such as the presence/absence of image files existing in the directory structure below DCIM and file properties is acquired from the directory entries and the like of the file system of the recording medium 200 or 210, and is stored as reference information in the memory 52 or the like shown in FIG. 1.

Whether a given image file is present or absent is determined, in compliance with the DCF standard, by the presence/absence of a DCF object existing immediately below the DCF directory "xxxyyyy" (where xxx represents a number from 100 to 999, and yyyy represents an arbitrary character string) immediately below "DCIM" which is the DCF root directory. A DCF object has a file name rule of jjjjkkkk.lll (where jjjj represents an arbitrary character string, kkkk represents a number from 0001 to 9999, and lll represents an extension). A file having the same "kkkk" (the same file number) as that of a DCF file is recognized as an identical object.

For example, referring to FIG. 2, immediately below ROOT/DCIM/100 CANOC, IMG_000.1.JPG is recognized as a DCF object with only image data, and IMG_0002.JPG and SND_0002.WAV are recognized as a DCF object with an image and a sound attached to the image. Audio file SDR_0006.WAV is excepted from DCF objects because there is no image file having the same file number as that of audio file SDR_0006.WAV.

If the operation unit 70 in FIG. 1 is operated to generate a request to acquire information about an image file by issuing an instruction to display an image next to the image displayed on the display unit 54 (step S302), information about the image file is acquired by the image directory analysis result held in step S301 and returned (step S303).

For example, in the playback mode, the information returned includes path information indicating the position of an image file in the medium which has the maximum file number in the DCF directory with the maximum directory number according to the DCF rule which is displayed first at the activation of the digital camera, path information accompanying subsequent display image selection by user's button operation, and the like.

In the recording mode, the information returned includes information about an inquiry whether next photography can be performed, i.e., information indicating whether a file with a new file name complying with the naming rule of the DCF standard can be created. For example, in a recording/playback apparatus designed to always record directory numbers and file numbers in ascending order, if the maximum directory number in a recording medium is xxx=999 and an image file of the maximum file number existing in the DCF directory is jjjj=9999, no new file name can be generated. In this case, therefore, information that inhibits photography is returned.

Assume that a sound recording mode is designated through the menu displayed on the display unit 54 or by operating a predetermined button or the like, and a request to acquire information about an audio file is generated (step S304). In this case, if the audio directory has not been analyzed (step S305), the audio directory is analyzed, and the analysis result is recorded and held as reference information in the memory 52 or the like in FIG. 1 (step S306).

In the audio directory, only audio files are handled. Therefore, immediately below ROOT/SNDR/100 CANOC in FIG. 2, only files with an extension that makes the files be handled as audio files, i.e., SDR_0001.WAV, SDR_0002.WAV, and SDR_0003.WAV, are regarded as targets to be handled, and IMG_0004.JPG is not regarded as a target.

When an independent sound is newly recorded in the state of FIG. 2, SDR_0004.WAV is obtained as a file name by adding 1 to SDR_0003.WAV instead of adding 1 to "0004" of IMG_0004.JPG which is the maximum value immediately below 100 CANOC.

If the audio directory has been analyzed (steps S305 and S306), information about an audio file is acquired by the audio directory analysis result held in step S306 and is returned (step S307).

If there is no request to acquire information about an image file or audio file (steps S302 and S304), it is checked whether a termination instruction such as an instruction to turn off the power supply of the digital camera 100 is issued (step S308). If a termination instruction is issued, this flow is terminated. If no termination instruction is issued, the flow returns to step S302.

As described above, according to this embodiment, when the digital camera 100 is to be activated, analyzing only the image directory makes it possible to speed up the activation processing. In addition, in an apparatus which mainly handles image files, e.g., a digital camera, information about images can be acquired more quickly. This improves the operability.

Note that this embodiment is directed to a digital camera, and hence priority is given to a search in the image directory. In another recording/playback apparatus, when files to be mainly handled are other than image files, a specific directory prepared for the files to be mainly handled may be analyzed first. In a recording/playback apparatus designed to mainly handle audio files, only the directory for audio files may be analyzed at the time of activation.

In addition, since image files and audio files are independently managed, only an image directory analysis result is referred to in accordance with an information acquisition request concerning image files, and only an audio directory analysis result is referred to in accordance with an information acquisition request concerning audio files. Since no unnecessary file information is mixed in each search result, reference to each analysis result can be speeded up.

If, for example, the user issues an operation request to erase all images through a button or the like of the apparatus, a path to files to be erased is determined by referring to only an image directory analysis result, and the files indicated by the path are erased. In this case, since no reference is made to information about independent audio files, the presence/absence of independent audio files has no influence on the speed of image file operation.

FIG. 4 is a view showing an example of an application window on a personal computer.

Many recording/playback apparatuses such as digital cameras can transfer recorded files to personal computers through an interface such as a USB.

Reference numeral 411 denotes an example of an application window for the execution of image file transfer at the time of file transfer.

Reference numeral 412 denotes an image capturing start button on a GUI (Graphical User Interface), which is used to issue an instruction to transfer an image file corresponding to a list of reduced images of the image files in the digital camera 100, which are displayed on a display portion 413, from the digital camera 100 to a recording medium such as a hard disk in a personal computer.

Reference numeral 414 denotes a button on the GUI for the activation of an application for audio file transfer.

Reference numeral 421 denotes an example of an application window for the execution of audio file transfer at the time of file transfer.

Reference numeral 422 denotes a sound capturing start button on the GUI, which is used to issue an instruction to transfer an audio file corresponding to a list of audio file information in the digital camera 100, which is displayed on a display portion 423, from the digital camera 100 to a recording medium such as a hard disk in a personal computer.

For example, at the time of activation of the application window 411, an instruction is issued to the digital camera 100 to acquire the information of image files, i.e., an instruction to analyze files below DCIM and acquire information. With this operation, since no audio directory is analyzed, the presence/absence of independent audio files has no influence on the activation speed of the application window. This makes it possible to increase the activation speed. The audio directory may be analyzed and information may be acquired when the application window 421 is activated by pressing the GUI button 414.

As described above, according to the above embodiment, in a digital camera having an image recording unit which records a plurality of sensed images obtained by a photographing unit by generating a specific directory having a predetermined directory structure on a layer of hierarchy immediately below the root directory at the uppermost level of a hierarchical structure, there is provided a sound recording unit which records a plurality of recorded sounds obtained by a sound recording unit by generating a specific directory different from the above specific directory which has the same directory structure as the predetermined directory structure. Storing image data and audio data in the identical hierarchical structures makes it easy to manage the data. In addition, individually defining a format (extension) for each specific directory makes it possible to limit the application of each specific directory.

In addition, performing at least one of operations including searching for a file for each specific directory described above, playing back a file, editing a file, changing the property of a file, and deleting a file makes it unnecessary to discriminate audio data or image data for each data file, because operation is performed for only the directory of image data or audio data. This makes it possible to increase the operation speed.

Since priority is given to search in a specific directory in which the images are recorded, the time required to additionally write image data and/or play back it can be shortened.

Furthermore, performing one of operations including searching for a file for each specific directory described above, playing back a file, editing a file, changing the property of a file, and deleting a file in accordance with an instruction from an external apparatus such as a PC (Personal Computer) makes it unnecessary to discriminate audio data or image data for each data file, because operation is performed for only the directory of necessary image data or audio data when the instruction is received from the external apparatus such as the PC. This makes it possible to increase the operation speed.

The management unit for a search target directory causes the image recording unit and the sound recording unit to simultaneously change the naming rule when a file is to be stored in a predetermined directory structure, thereby sharing setting items which can be shared in setting operation. This makes it possible to simplify the operation by the user.

The above embodiment has exemplified the digital camera. However, the present invention can be applied to recording/playback apparatuses other than digital cameras, and can also be applied to recording/playback apparatuses which handle data other than image data and audio data.

The above embodiment has exemplified the case wherein the naming rule for files in directories complies with the DCF standard. When the naming rule in the case wherein files are stored in a directory structure is to be changed, the naming rule is simultaneously changed in the image recording directory and the sound recording directory.

According to the first embodiment, in a recording/playback apparatus such as a digital camera, the convenience in performing processing, e.g., searching for data, can be improved.

Second Embodiment

Figure 5:
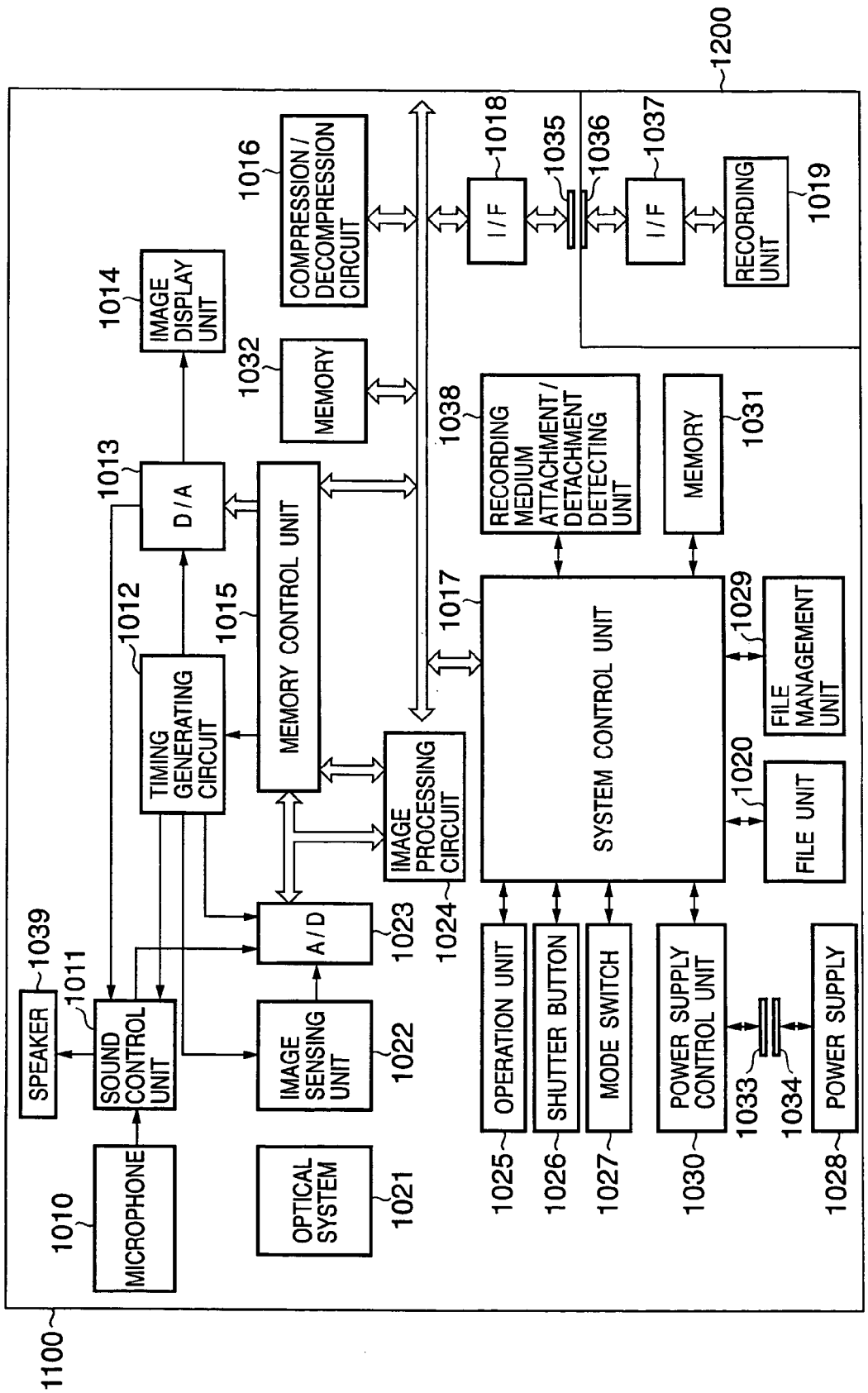
FIG. 5 is a block diagram showing an example of the arrangement of a digital camera as the second embodiment of a file management apparatus according to the present invention.

FIG. 5 is a block diagram showing an example of the arrangement of a digital camera according to the second embodiment of the file management apparatus according to the present invention.

Referring to FIG. 5, a digital camera 1100 has an optical system 1021 comprising a photographing lens, an image sensing unit 1022 which converts an optical image into an electric signal, and an A/D converter 1023 which converts an analog signal into a digital signal. The A/D converter 1023 is used to convert an analog signal output from the image sensing unit 1022 or an analog signal output from a sound control unit 1011 into a digital signal.

A timing generating circuit 1012 supplies clock signals and control signals to the image sensing unit 1022, the sound control unit 1011, the A/D converter 1023, and a D/A converter 1013. The timing generating circuit 1012 controls a memory control circuit 1015 and a system control unit 1017. An image processing circuit 1024 performs predetermined pixel interpolation processing and color conversion processing for data from the A/D converter 1023 or data from the memory control circuit 1015.

In addition, in the image processing circuit 1024, the system control unit 1017 performs computation processing for the execution of AF (Auto Focus) processing, AE (Auto Exposure) processing, and EF (Electronic Flash pre-emission) processing of the TTL (Through The Lens) scheme with respect to sensed image data. The image processing circuit 1024 also performs predetermined computation processing by using sensed image data and performs AWB (Auto White Balance) processing of the TTL scheme on the basis of the obtained computation result.

Output data from the A/D converter 1023 is written in a memory 1032 through both the image processing circuit 1024 and the memory control circuit 1015 or only the memory control circuit 1015.

The memory 1032 is provided to store photographed still and moving image data and file headers when image files are formed from the data, and has a storage capacity sufficient enough to store a predetermined number of still images or a predetermined time period of moving images.

A compression/decompression circuit 1016 compresses and decompresses still image/moving image data by using a compressing/encoding method using adaptive discrete cosine transform (ADCT). The compression/decompression circuit 1016 is triggered by a shutter 1026 to read in a photographed image stored in the memory 1032, compress the image, and write the resultant data in the memory 1032.

A recording unit 1019 or the like reads in a compressed image stored in the memory 1032, decompresses the image, and writes the resultant data in the memory 1032.

The image data written in the memory 1032 by the compression/decompression circuit 1016 is formed into a data file by a file unit 1020 of the system control unit 1017. This file is recorded in a recording medium 1200 through an interface 1018.

The memory 1032 is also used as an image display memory. The display image data written in the memory 1032 is displayed on an image display unit 1014 comprising an LCD through the D/A converter 1013.

An audio signal output from a microphone 1010 is converted into a digital signal by the A/D converter 1023 through the sound control unit 1011 comprising an amplifier and the like. This digital signal is stored in the memory 1032 by the memory control unit 1015.

The audio data stored in the memory 1032 is formed into a data file by the file unit 1020 of the system control unit 1017 and is recorded in the recording medium 1200 through the interface 1018. On the other hand, the audio file recorded in the recording medium 1200 is read in the memory 1032, and is converted into an analog signal through the D/A converter 1013. The signal controlled by the sound control unit 1011 then produces a sound from a speaker 1039.

The system control unit 1017 is, for example, a CPU, which controls the overall digital camera 1100 by executing control programs recorded in a ROM (not shown) or a memory 1031. The memory 1031 is a memory which stores constants, variables, programs, and the like for the operation of the system control unit 1017.

An operation unit 1025 is provided as an input means for allowing the user to input instructions to the digital camera 1100, and comprises an erase button, a menu button, a SET (selection/execution) button, four direction keys arranged in a crisscross pattern, and the like.

When the menu button is pressed, a menu window which allows various settings is displayed on the image display unit

1014. The user can intuitively make various kinds of settings by moving, selecting, and setting in the menu window displayed on the image display unit 1014 by using the direction keys and the SET button.

The shutter button 1026 has, for example, a switch which is turned on in a half pressed state, and a switch which is turned on in a fully pressed state, and is used as a start trigger for AF processing and AE processing and as a start trigger for photography.

A mode switch 1027 is a switch for allowing the user to switch the operation mode of the digital camera 1100 (system control unit 1017) between a photographing mode, an image playback mode, a sound recording/playback mode, and the like.

A power supply control unit 1030 comprises a battery detection circuit, a DC-DC converter, a switch circuit which switches blocks to be energized, and the like. The power supply control unit 1030 detects the presence/absence of a battery, the type of battery, and a remaining battery level, and controls a DC-DC converter on the basis of the detection result and an instruction from the system control unit 1017, thereby applying a necessary voltage to each unit including the recording unit 1019 for a necessary period of time.

A power supply 1028 comprises a primary battery such as an alkaline battery or a lithium battery, a secondary battery such as a NiCd battery, a NiMH battery, or a Li-ion battery, an AC adapter, and the like, and is attached to the digital camera 1100 through connectors 1033 and 1034.

The interface 1018 is a camera-side interface with the recording medium 1200 such as a memory card or hard disk. The recording medium 1200 is connected to the communication unit 110 through connectors 1035 and 1036. The connector 1035 is used for connection with a recording medium such as a memory card or hard disk. A recording medium attachment/detachment detecting unit 1038 detects whether the recording medium 1200 is attached to the connector 1035.

The recording medium 1200 comprises a memory card, a hard disk, or the like. The recording medium 1200 comprises the recording unit 1019 comprising a semiconductor memory, a magnetic disk, or the like, an interface 1037 with the camera 1100, and the connector 1036 fitted to the connector 1035 on the camera side.

Figure 6:
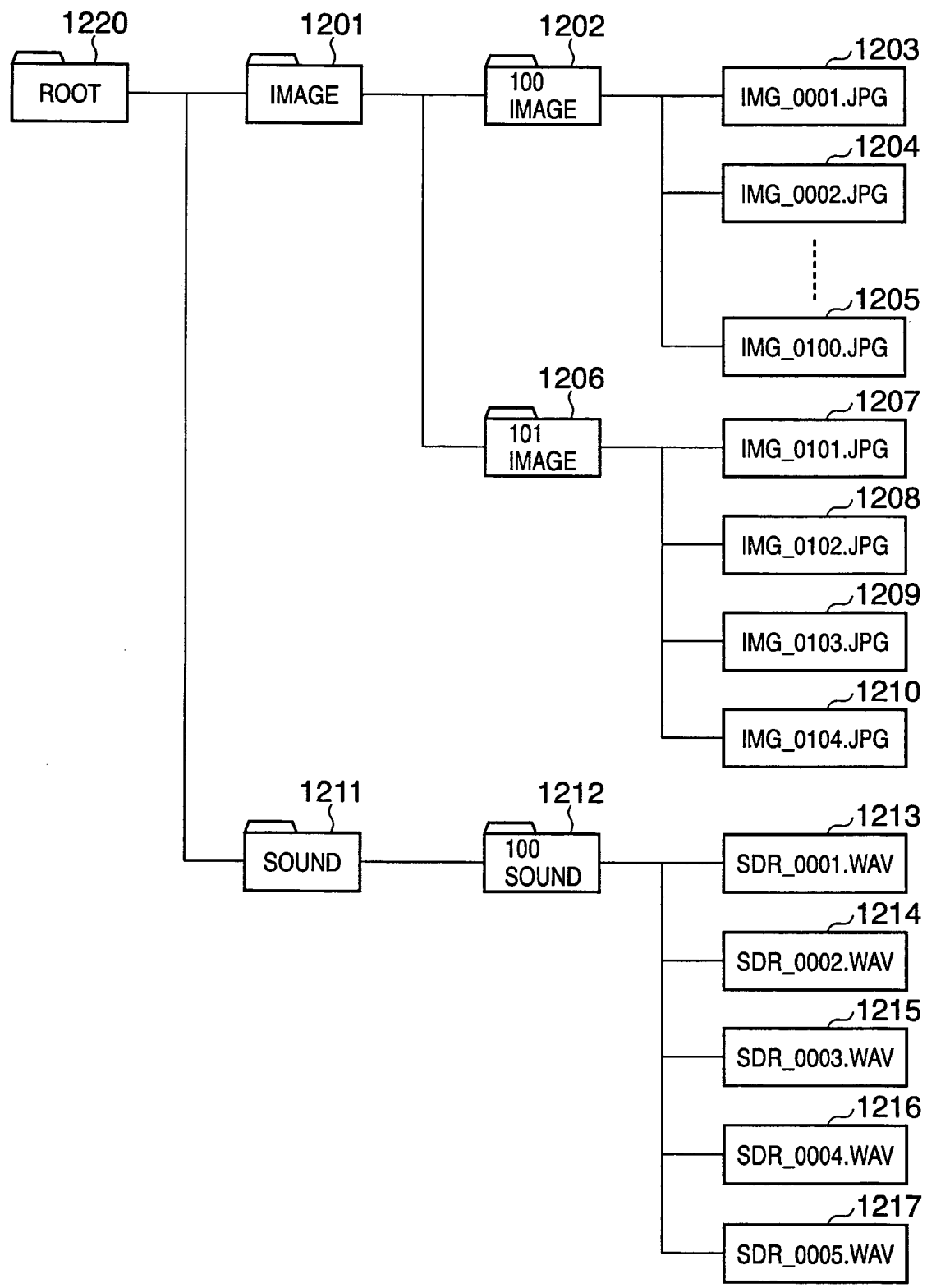
FIG. 6 is a view showing an example of a data structure to be used when the digital camera according to the second embodiment records various kinds of data in a recording medium.

FIG. 6 is a view showing an example of a data structure which is used when the digital camera 1100 of this embodiment records various kinds of data in the recording medium 1200. The digital camera 1100 of this embodiment records data files in accordance with the hierarchical directory structure. Image data are stored in an IMAGE directory 1201 immediately below a ROOT directory 1220. The directories below the IMAGE directory 1201 are assigned directory numbers and file numbers on the basis of unique numbers counted up every time photography is performed.

For example, directory numbers are sequentially assigned starting with 100, and a 100 IMAGE directory 1202 is generated on the basis of the directory numbers. In the 100 IMAGE directory 1202, image files having file names assigned file numbers which are sequentially counted up from 1 are recorded.

For example, files named IMG_0001.JPG (1203) and IMG_0002.JPG (1204) are generated and recorded at the time of photography. In one IMAGE directory, up to 100 image files are stored. For example, in the 100 IMAGE directory 1202, files up to IMG_0100.JPG (1205) are stored. Upon photography of the 101st frame, a 101 IMAGE directory 1206 is newly generated, in which a file 1207 named IMG_0101.JPG is newly created. In the 101 IMAGE directory 1206 as well, as in the 100 IMAGE directory 1202, image files having file names assigned numbers which are counted up one by one are created and recorded (1208, 1209, 1210).

A SOUND directory 1211 different from the image directory is generated immediately below the ROOT directory 1220, and audio data is recorded in the SOUND directory.

Directory names and file names for the storage of audio data are generated by using names including numbers which are increased one by one like directories and files for image data.

Assume that SOUND directory names are generated by using numbers which increase one by one from 100, and audio data file names are generated by using numbers which increase one by one from 1 (0001). First of all, therefore, a 100 SOUND directory 1212 is generated, and files with names including 0001, 0002, . . . are sequentially created and recorded in the directory every time sound recording is performed. For example, audio file names are generated like SDR_0001.WAV (1213) and SDR_0002.WAV (1214).

<Initial Operation>

Figure 10:
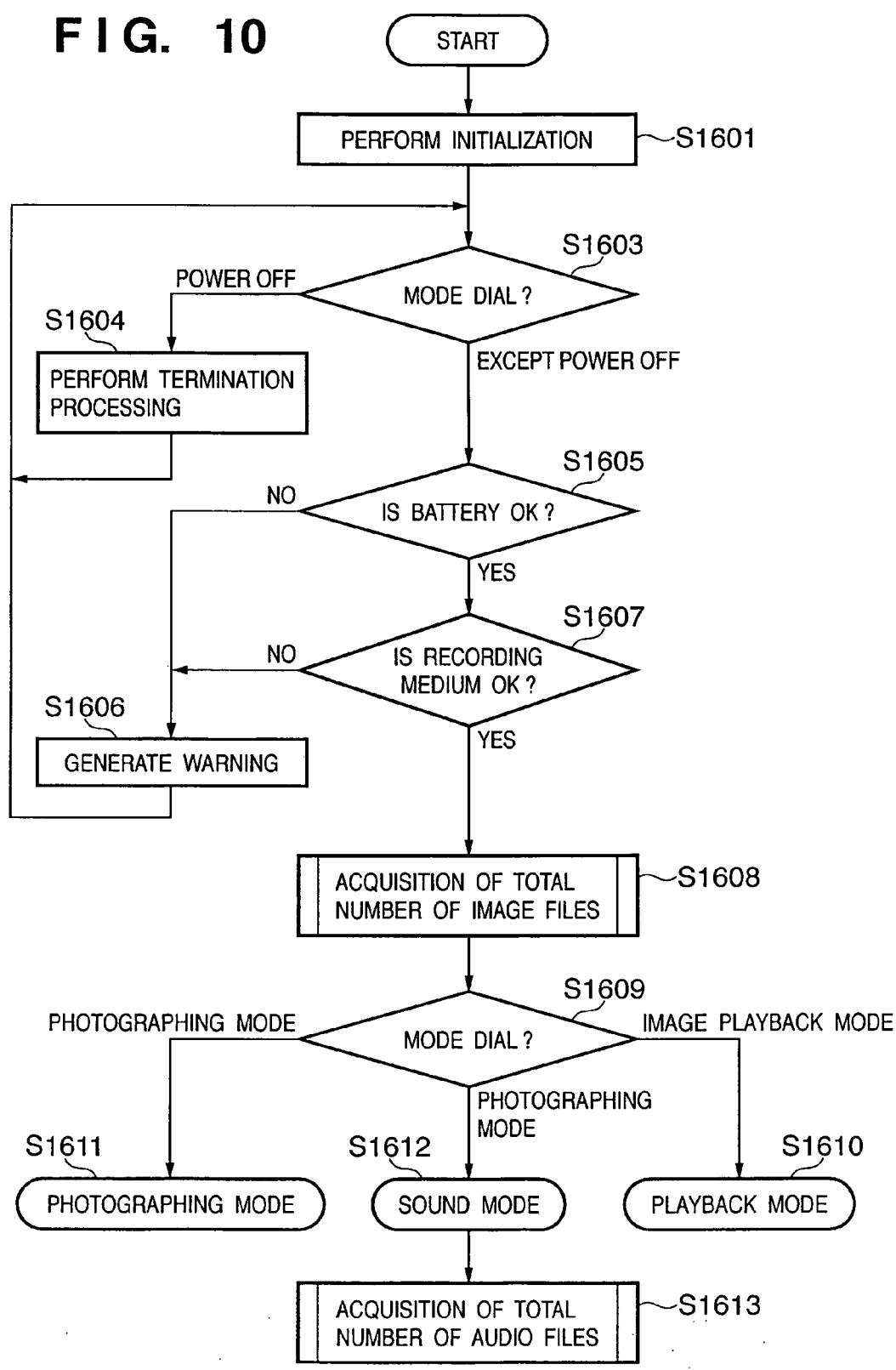
FIG. 10 is a flowchart for explaining the initial operation of the digital camera according to the second embodiment.

The initial operation of the digital camera 1100 in which the recording medium 1200 having the file arrangement shown in FIG. 6 is mounted will be described with reference to the flowchart of FIG. 10. This processing is performed when the main power supply is turned on upon battery change or the recording medium 1200 is mounted.

First of all, the system control unit 1017 initializes flags, control variables, and the like in the memory 1031 (S1601).

The system control unit 1017 detects the set position of the mode switch 1027. If the mode switch 1027 is set to power OFF (S1603), the system control unit 1017 performs predetermined termination processing, e.g., causing the power supply control unit 1030 to cut off unnecessary power to each unit of the digital camera 1100 (S1604). The flow returns to step S1603.

If the mode switch 1027 is not set to power OFF (S1603), the system control unit 1017 causes the power supply control unit 1030 to determine whether the remaining capacity or operation state of a power supply 28 comprising a battery and the like is posing any problem in terms of the operation of the digital camera 1100 (S1605). If a problem is posed, predetermined warning display is performed by using the image display unit 1014 (S1606), and the flow returns to step S1603.

If no problem is posed in the power supply 1028 (S1605), the system control unit 1017 determines whether the operation state of the recording medium 1200 is posing any problem in the operation of the digital camera 1100, recording/playback operation for image data with respect to the recording medium in particular (S1607). If a problem is posed, predetermined warning display is performed by using the image display unit 1014 (S1606), and the flow returns to step S1603.

If no problem is posed in the operation state of the recording medium 1200 (S1607), the system control unit 1017 causes a file management unit 1029 to acquire the total number of image files recorded under the directory (IMAGE directory) 1201 for images in the recording medium 1200 (S1608). The processing of acquiring the total number of image files will be described in detail later.

The system control unit 1017 determines the position of the mode switch 1027 again after the total number of image files is acquired. If the photographing mode is set, the system control unit 1017 shifts to the photographing mode (S1611). If the image playback mode is set, the system control unit 1017 shifts to the playback mode (S1610). If the audio mode is set, the system control unit 1017 shifts to the audio mode (S1612). If the system control unit 1017 shifts to the audio mode, the unit performs the processing of acquiring the total number of audio files (S1613).

<Processing of Acquiring Total Number of Image Files>

Figure 11:
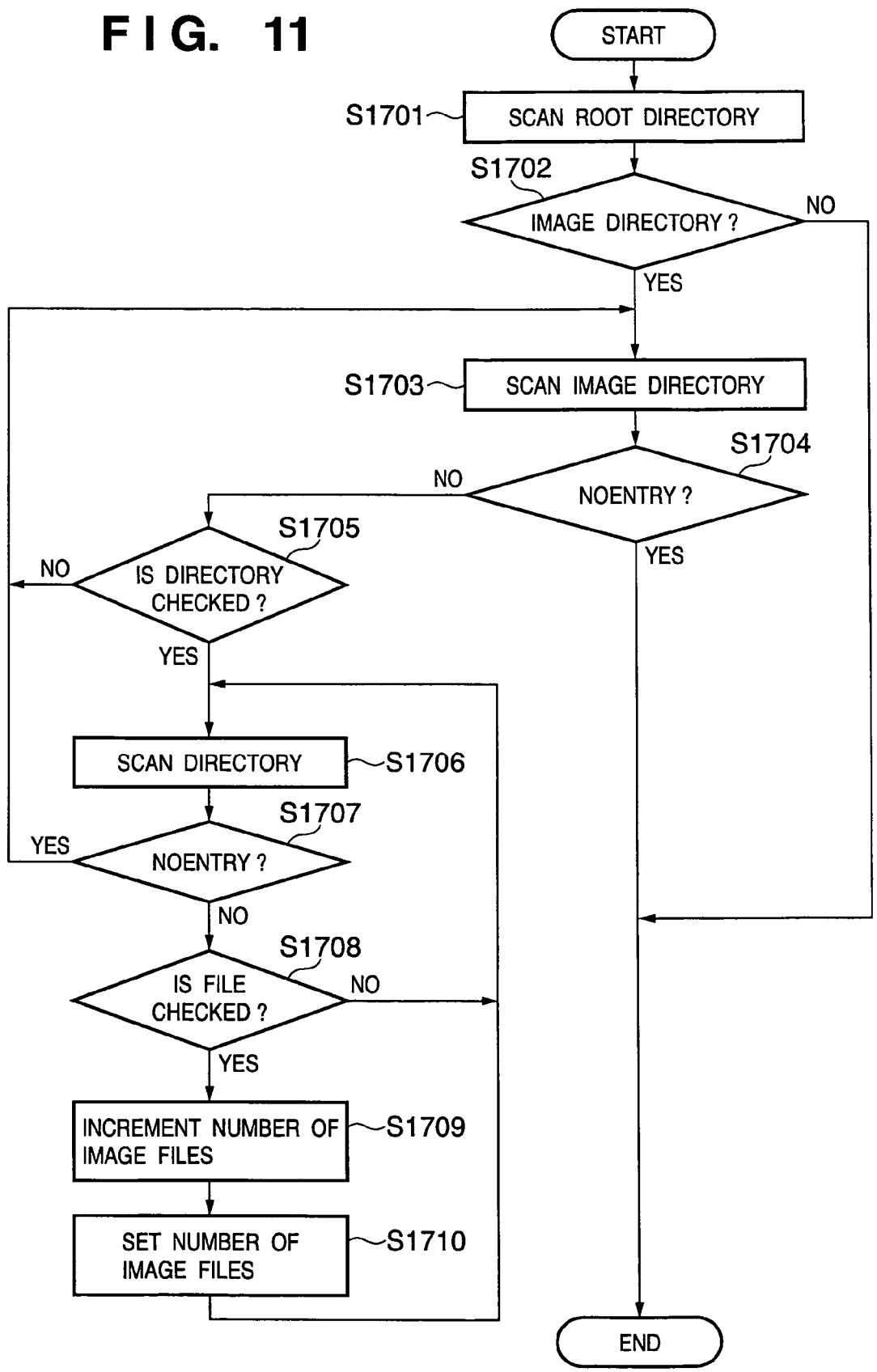
FIG. 11 is a flowchart for explaining processing of acquiring the total number of image files in step S1608 in FIG. 10.

The processing of acquiring the total number of image files which is performed in step S1608 in FIG. 10 will be described with reference to the flowchart of FIG. 11.

This processing is performed by the file management unit 1029 as a total file count detection means. The file management unit 1029 scans the entries of the ROOT directory 1220 of the recording medium 1200 (S1701). If the IMAGE directory 1201 is not found (S1702), the processing is terminated.

If the IMAGE directory 1201 is found as a result of the entry scan in the ROOT directory 1220 (S1701), the entries of the IMAGE directory 1201 are scanned (S1703). If no file entry is found as a result of this entry scan (S1704), the processing is terminated.

Assume that there is a file entry in the IMAGE directory 1201 (S1704). In this case, if the entry is neither a directory nor in a form (numerical value+"IMAGE") like 100 IMAGE (1202) even if it is an directory (S1705), the flow returns to entry scan in the IMAGE directory (S1703).

It is determined in step S1705 that the target file entry is a directory for the storage of images which has a predetermined form, the entries of, for example, of the 100 IMAGE directory (1202) are scanned (S1706). If no file entry is found as a result of the scan (S1707), the flow returns to the entry scan processing for the IMAGE directory 1201 (S1703).

If it is determined in step S1707 that there is an entry, it is checked in step S1708 whether the target entry is a file and its file name is in a form for an image file like IMG_0001.JPG (1203). If the file name coincides with the image file form, the found file is recognized as an image file, and the number of image files is incremented (S1709). The number of image files is stored in the memory 1031 (S1710), and the flow returns to the entry scan processing in the 100 IMAGE directory 1202 (S1706).

If the entry is not a file or the file name is not in a form like IMG_0001.JPG (1203) (S1708), the flow returns to the entry scan processing in the 100 IMAGE directory 1202 (S1706). In this manner, the entry scan in the 100 IMAGE directory 1202 is repeated until no entry is found.

When all the entries in the IMAGE directory 1201 are scanned, no entry is found finally (S1704). This processing is then terminated.

With processing of acquiring the total number of audio files which is executed when the digital camera 1100 shifts to the audio mode (S1613), the total number of audio files can be acquired in the same manner as the total number of image files.

That is, as described above, audio files are stored under the SOUND directory 1211 which exists parallel to the IMAGE directory 1201 under the ROOT directory 1220. Therefore, the total number of audio files can be acquired by changing the directory in which entry scan is performed and the determination condition (file name form) for file names into those for audio files in the above flowchart for the acquisition of the total number of image files.

The file management unit 1029 stores the acquired total number of audio files in the file management unit 1029 as in the case of the total number of image files.

<Processing of Generating Format Menu Window for Recording Medium>

Operation to be performed when the digital camera 1100 displays a format menu window for the recording medium 1200 in the photographing mode (S1611) or the playback mode (S1610) will be described next with reference to FIGS. 7 and 8.

Figure 8:
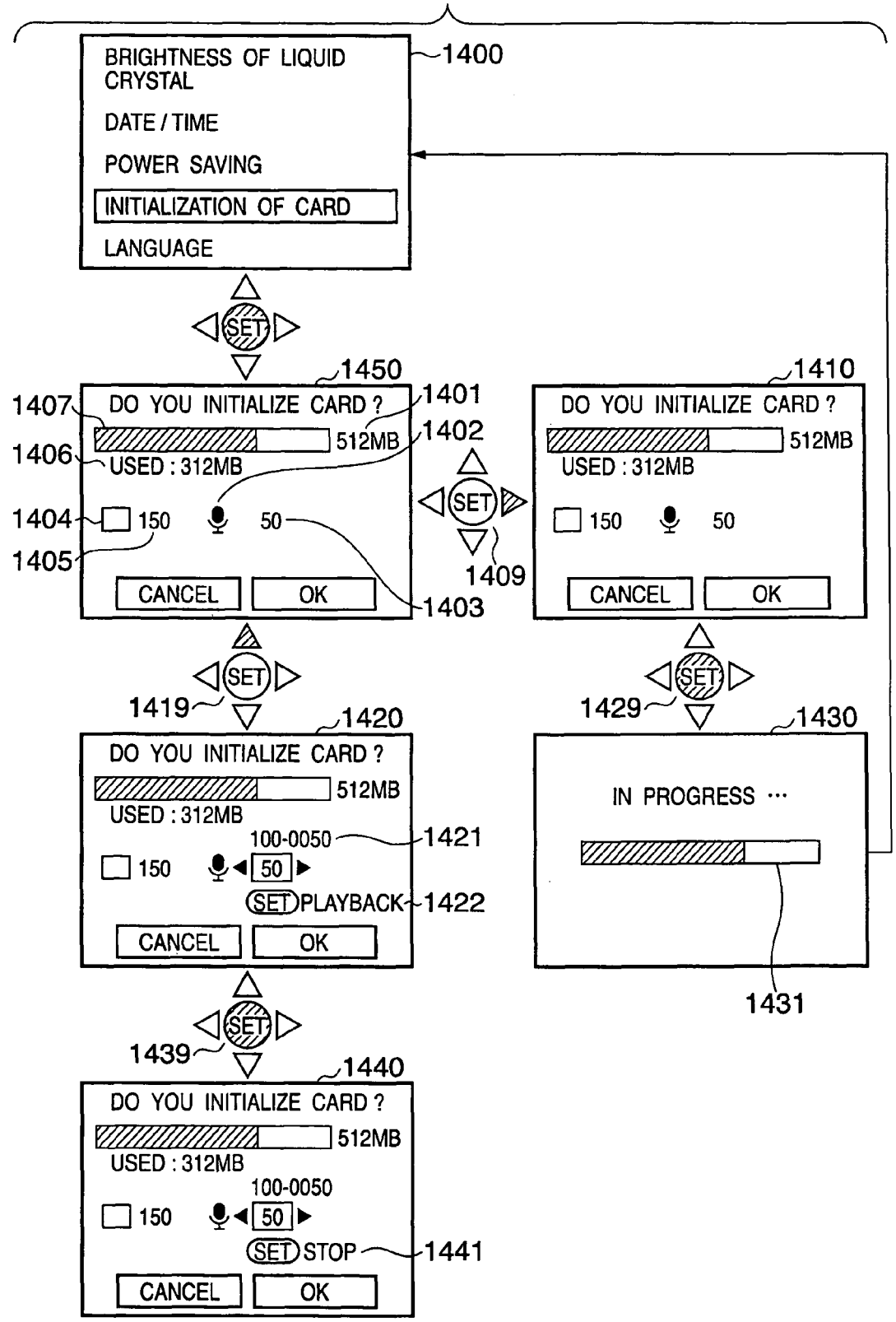
FIG. 8 is a view showing a formatting window displayed by a digital camera according to the second embodiment and an example of window transition corresponding to the operation of a menu button, direction keys, and a SET button included in an operation unit.

FIG. 8 is a view showing a formatting window displayed by the digital camera and an example of window transition corresponding to the operation of a menu button, direction keys, and SET button included in the operation unit.

When the menu button of the operation unit 1025 is pressed, the system control unit 1017 generates menu display data in the memory 1032, and displays the data on the image display unit 1014. A window 1400 in FIG. 8 is an example of an initial menu window to be displayed when the menu button is pressed.

The user can display an individual menu by selecting a desired item using the up and down keys of the direction keys and pressing the SET button in such a menu screen. In this case, if "card initialization" is selected, and the SET button is pressed, the system control unit 1017 generates an initialization menu window 1450 and displays it on the image display unit 1014.

Figure 7:
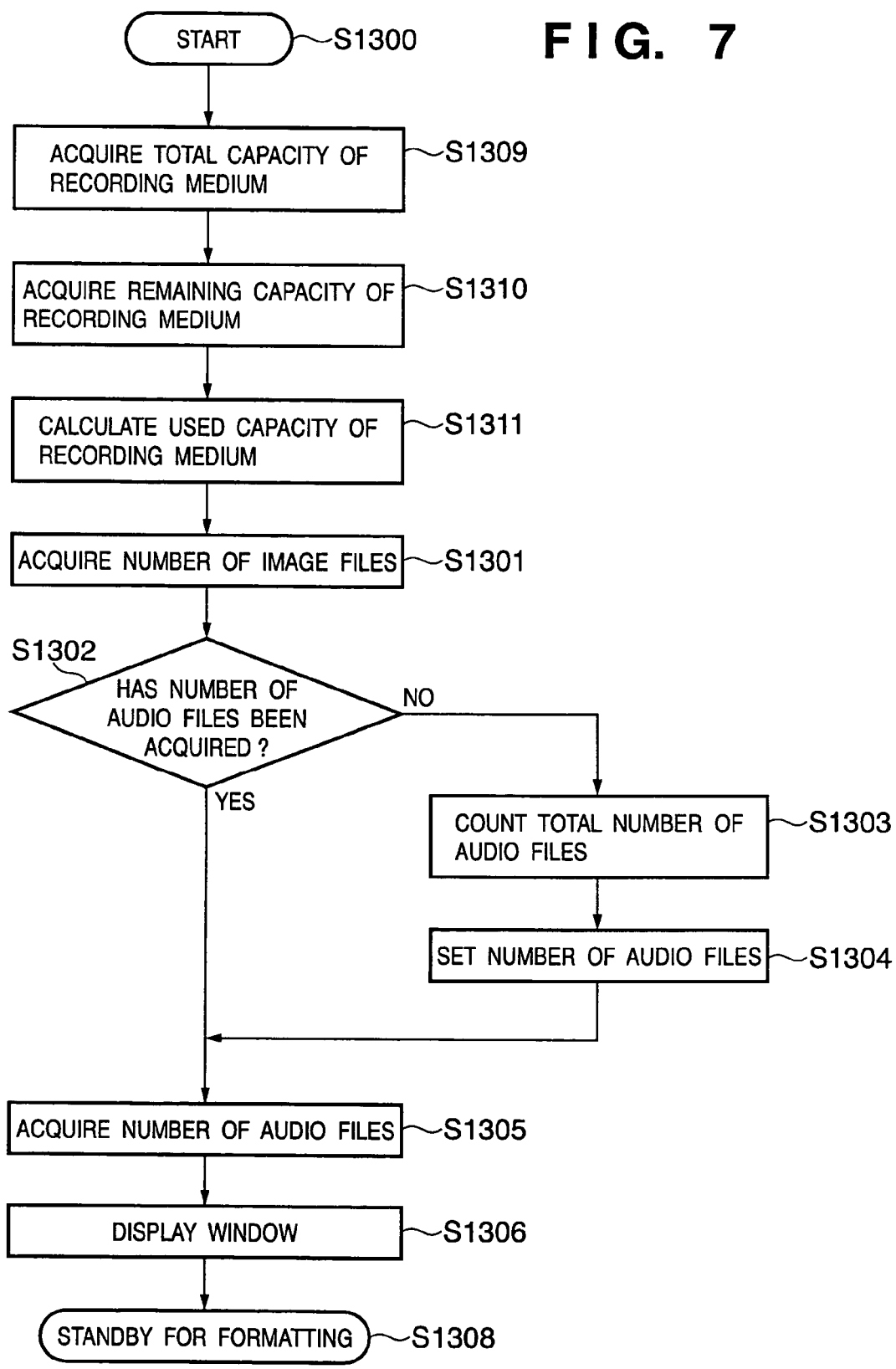
FIG. 7 is a flowchart for explaining processing to be performed when the digital camera according to the second embodiment displays a format menu window for a recording medium.

FIG. 7 is a flowchart for explaining the processing to be performed by the system control unit 1017 when the format menu window for the recording medium is displayed.

The system control unit 1017 acquires management information from a predetermined area of the recording medium 1200 and acquires the total capacity of the recording medium 1200 from the management data (S1309). The system control unit 1017 also acquires the remaining capacity of the recording medium 1200 from the management information (S1310). The system control unit 1017 then calculates the used capacity of the recording medium by subtracting the remaining capacity acquired in step S1310 from the total capacity acquired in step S1309 (S1311). Note that if a used capacity is included as management information, it may be directly acquired from the management information.

The system control unit 1017 then acquires the number of image files stored in the memory 1031 (S1301), and refers to the memory 1031 to determine whether the number of audio files has been acquired (S1302). If the number of audio files has not been acquired, the recording medium 1200 is scanned to acquire the total number of audio files in the above manner (S1303). The acquired value is stored in the memory 1031 (S1304).

In step S1305, the system control unit 1017 acquires the total number of audio files stored in the memory 1031. A format menu window is generated by using each information acquired in this manner and is displayed on the image display unit 1014 (S1306).

As described above, in this embodiment, the total number of audio files is acquired only when required, e.g., when a format menu window is generated or the audio mode is set. Therefore, the processing of acquiring the number of audio files will not delay the activation processing in the photographing mode (S1611), which is normal use, and in the playback mode (S1610), and subsequent operation. In addition, since the total number of files, acquired once, is held in the memory 1031, there is no need to scan the directories in the recording medium 1200 unless the number of files changes. Therefore, this can also prevent the occurrence of a delay in operation due to the acquisition of the number of files.

FIG. 8 shows an example of the format menu window 1450 in this embodiment.

In the format menu window 1450, reference numeral 1401 denotes the total capacity of the recording medium 1200; 1406, the current used capacity of the recording medium 1200; 1407, a status bar which visually expresses the total capacity and the current used capacity; 1404, an icon representing an image file; 1405, the total number of images; 1402, an icon representing an audio file; and 1403, the total number of audio files.

Displaying the icons 1402 and 1404 as pieces of information representing file types in juxtaposition with the corresponding total file counts 1403 and 1405 makes it possible to clearly comprehend the association between the types of files and the total numbers of files existing in the recording medium 1200. This can therefore call user's attention to which types of data files and how many files will be erased when formatting is executed.

In the format menu window 1450, the "cancel" button is selected by default to prevent erroneous execution designation. If a right key 1409 is pressed in this state, the system control unit 1017 moves the selected state (focus) from the "cancel" button to the "OK" button (window 1410). When a SET button 1429 is pressed in a window 1410, formatting operation of writing initialization data in the management area of the recording medium is started.

At this time, the system control unit 1017 generates a window 1430 including a progress bar 1431 indicating the progress of formatting, and displays the window on the image display unit 1014. The state of the progress bar 1431 is sequentially updated in accordance with the progress of the processing.

When the formatting operation for the recording medium 1200 is complete, the system control unit 1017 displays the upper-level menu 1400 again, and notifies the completion of the formatting operation.

When an up key 1419 is pressed in the format menu window 1450, the system control unit 1017 moves the focus to the total number of audio files (window 1420). In addition, the system control unit 1017 displays triangular Icons on the left and right sides of the total number of audio files to notify the user that the total number of audio files to be deleted can be changed by using the left and right keys.

The system control unit 1017 also displays an ID 1421 obtained by connecting a directory number ("100" of 100 SOUND) coinciding with the number of audio files and a file number ("0050") with a hyphen.

The system control unit 1017 also displays a guidance 1422 "SET playback" below the number. When the SET button is pressed in this state, the system control unit 1017 performs display to notify the user that a file having the ID 1421 as a name is played back.

When a SET button 1439 is pressed in this state, the file currently indicated by the ID 1421 is read from the recording medium 1200 into the memory 1032, and the audio signal analog-converted by the D/A converter 1013 is controlled by the sound control unit 1011, thereby producing a sound from the speaker 1039 (window 1440).

During the playback of the audio file corresponding to the ID 1421, the guidance below the total audio file count 1403 is set to "SET stop" 1441 to notify the user that the sound playback operation can be stopped by pressing the SET button. If the SET button is pressed in this state, the sound playback operation is stopped.

In this manner, the total audio file count 1403 displayed in the format menu window 1450 is used, and the playback operation of a file stored in the recording medium 1200 is implemented. This makes it possible to check data to be erased before the execution of formatting.

<Update Processing of Total Number of Files>

Figure 9:
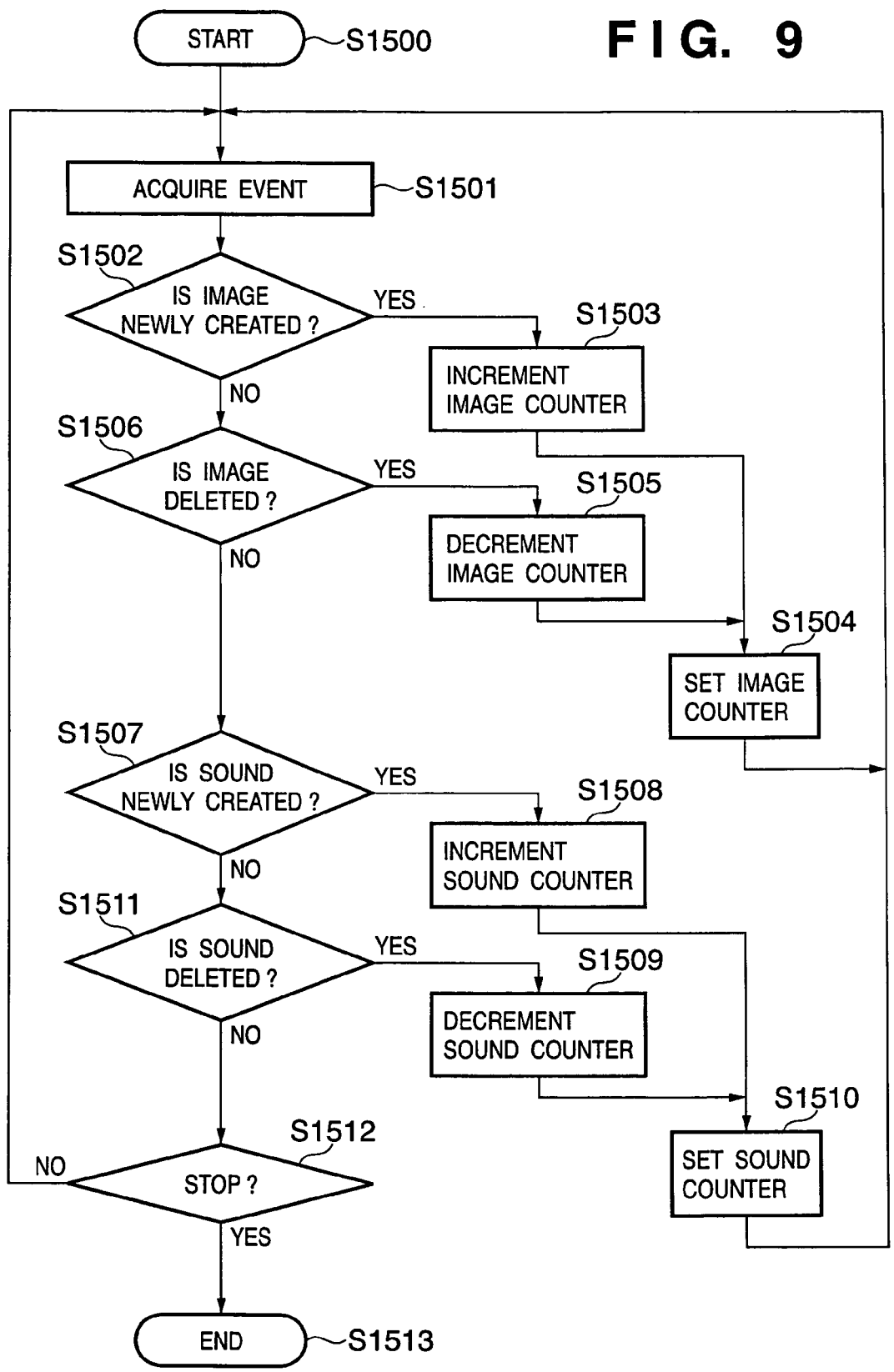
FIG. 9 is a flowchart for explaining maintenance processing for the total number of files, which accompanies file operation processing in the digital camera according to the second embodiment.

The update processing of the total number of files upon file operation in the digital camera 1100 activated in the photographing mode (S1611) or the playback mode (S1610) will be described next with reference to the flowchart of FIG. 9.

This processing is executed when the system control unit 1017 executes the creation or deletion of a file. Upon detecting the pressing of the delete button included in the operation unit 1025 (or the pressing of the SET button which instructs the execution of deletion), the system control unit 1017 deletes the designated image file. Upon detecting the full pressing of the shutter button 1026, the system control unit 1017 performs photography and creates a new image file. Upon executing the creation or deletion of an image, the system control unit 1017 notifies the file management unit 1029 of the execution of the processing as an event.

First of all, the file management unit 1029 as a total file count updating means monitors an event (S1501). Upon receiving a notification of an event of image new creation (S1502), the file management unit 1029 increments an image counter (e.g., a variable set in advance by reading out the total number of image files stored in the memory 1031) by one (S1503). The total number of image files held in the memory 1031 is updated in accordance with the value of this image counter (S1504).

Upon receiving an image deletion notification (S1506), the file management unit 1029 decrements the image counter by one (S1505), and updates the total number of image files held in the memory 1031 with the value of the image counter (S1504).

Likewise, upon detecting an event of audio file new creation (S1507), the file management unit 1029 increments an audio counter by one (S1508), and updates the total number of audio files held in the memory 1031 in accordance with the value of the audio counter (S1510). When an audio file is deleted (S1511), the audio counter is decremented by one (S1509), and the total number of audio files held in a memory 31 is updated in accordance with the value of the audio counter (S1510).

When the event handler of the file management unit 1029 receives a stop command from the system control unit 1017 (S1512), the event handler terminates the operation.

As described above, according to this embodiment, since the number of files existing in a recording medium is presented to the user for each file type, the user can know the number of files to be erased upon execution of formatting before the execution of formatting for each file type.

The processing of acquiring the total number of files of each file type recorded in the recording medium 1200 is performed once for each file type. Thereafter, the number of files is updated upon detection of operation such as new creation or deletion of a target file. This makes it unnecessary to scan the recording medium 1200 again, even if the current total number of files of each file type is required upon generation of the format menu window 1450 or the like. This makes it possible to provide the user with more detailed information than in the prior art without degrading the operability of the digital camera 1100.

According to the second embodiment, in a file management apparatus capable of formatting recording media, more detailed information than in the prior art can be presented to the user before the execution of formatting.

Other Embodiment

In order to facilitate understanding of the present invention, the above embodiments have exemplified the case wherein file types include only still images (JPEG format) and sounds (WAV format). However, the file types to be handled may further include other file types such as moving images. In addition, such files may include files which belong to the same file type but are formed in different formats (e.g., the JPEG format, GIF format, and BMP format concerning still image files). In this case, the total number of files may be detected for each type or for each file format.

Note that the present invention incorporates a case wherein the functions of the above embodiments are implemented by supplying programs of software for implementing the functions of the embodiments directly from a recording medium or by wire/wireless communication to an apparatus having a computer capable of executing the programs and causing the apparatus to execute the supplied programs.

The program codes themselves which are supplied and installed in the computer to allow the computer to implement the functions/processing of the present invention also implement the present invention. That is, the computer programs themselves, which implement the functions/processing of the present invention, are also incorporated in the present invention.

In this case, each program may take any form, e.g., an object code, a program executed by an interpreter, and script data supplied to an OS, as long as it has the function of the program.

As a recording medium for supplying the programs, a flexible disk, a hard disk, a magnetic recording medium such as a magnetic tape, an optical/magnetooptic recording medium such as an MO, a CD-ROM, a CD-R, a CD-RW, a DVD-ROM, a DVD-R, a DVD-R, or a DVD-RW, a nonvolatile semiconductor memory, or the like can be used.

In a case wherein the apparatus which executes the present invention has a connection function with a computer network, an example of the method of supplying a program by wire/wireless communication is a method of storing, in the server on the computer network, the computer program itself which implements the present invention or a data file (program data file) which can be a computer program for implementing the present invention in an implementation apparatus, e.g., a compressed file including an automatic installation function, and downloading the program data file to a connected implementation apparatus. In this case, the program data file can be divided into a plurality of segment files, and the segment files can be stored in different servers.

In addition, it suffices to directly connect an implementation apparatus to an external computer and download software programs constituting the present invention from the external computer to a nonvolatile memory in the implementation apparatus.

The present invention is not limited to the above embodiments and various changes and modifications can be made within the spirit and scope of the present invention. Therefore, to apprise the public of the scope of the present invention the following claims are made.

This application claims the benefit of Japanese Patent Application No. 2005-120011 filed on Apr. 18, 2005 and Japanese Patent Application No. 2005-123988 filed on Apr. 21, 2005, which are hereby incorporated by reference herein in its entirety.

What is claimed is:

1. A recording/playback apparatus constructed to record image files and audio files, comprising:
   a mode selection unit which selects one operation mode from an image recording mode, an image playback mode and an audio mode;
   a determination unit which determines a mode selected by said mode selection unit;
   a management device which manages a DCIM directory and an audio directory for recording an audio file immediately below a root directory at an uppermost level in a hierarchical structure of a file system of a recording medium, such that image files are recorded in the DCIM directory, and such that image files recorded in the audio directory are not handled by the management device; and
   a control device which controls to analyze a directory of the image file recorded inside the DCIM directory while declining to analyze the audio directory after the recording/playback apparatus is activated and before said determination unit determines the mode selected by said mode selection unit, which controls said determination unit to determine the mode selected by said mode selection unit after the analysis of the image files recorded in the DCIM directory has finished, and which controls to analyze the audio directory when said determination unit determines that the mode is the audio mode.

2. The apparatus according to claim 1, further comprising an image capture unit which captures an object and acquires an image data when the mode selected by the selection unit is the image recording mode.

3. The apparatus according to claim 1, wherein a file number conforming to a DCF standard is assigned to an image data which is recorded in the DCIM directory.

4. A method of controlling a recording/playback apparatus, comprising:
   a mode selection step of selecting one operation mode from an image recording mode, an image playback mode and an audio mode according to a mode switching switch on the digital camera;
   a determination step which determines a mode selected by said mode selection step;
   a managing step of managing a DCIM directory and an audio directory for recording an audio file immediately below a root directory at an uppermost level in a hierarchical structure of a file system of a recording medium, such that image files are recorded in the DCIM directory, and such that image files recorded in the audio directory are not handled in the managing step; and
   a control step of controlling to analyze a directory of the image file recorded inside the DCIM directory while declining to analyze the audio directory after the recording/playback apparatus is activated and before the determination step determines the mode selected by said mode selection step, of controlling to determine the mode selected by said mode selection step after the analysis of the image files recorded in the DCIM directory has finished, and of controlling to analyze the audio directory when said determination step determines that the mode is the audio mode.

5. The method according to claim 4, further comprising an image capture step of capturing an object and acquiring an image data when the mode selected by the selection step is the image recording mode.

6. The method according to claim 4, wherein a file number conforming to a DCF standard is assigned to an image data which is recorded in the DCIM directory.

7. A storage medium for computer-readably storing a program causing a computer to execute the method defined in claim 4.

* * * * *